United States Patent [19]
Heywood, Jr.

[11] Patent Number: 5,541,239
[45] Date of Patent: Jul. 30, 1996

[54] ULTRAVIOLET RADIATION PROTECTION FOR MARINE VARNISH

[76] Inventor: Newell W. Heywood, Jr., 952 Laurel Ave., San Mateo, Calif. 94401

[21] Appl. No.: 378,046

[22] Filed: Jan. 24, 1995

[51] Int. Cl.$^6$ .............................. C08K 9/00; C08K 7/16; C08J 3/00; C08L 75/00

[52] U.S. Cl. .................... 523/223; 523/200; 523/206; 524/507

[58] Field of Search ............................ 524/507; 523/200, 523/205, 223

[56] References Cited

U.S. PATENT DOCUMENTS 5,274,016  12/1993  Berner et al. ........................... 523/223

Primary Examiner—Paul R. Michl
Assistant Examiner—Patrick Niland

[57] ABSTRACT

A solid, coherent film of dried varnish formed from liquid suspension varnish composition, the film of dried varnish consisting essentially of a solid coherent film polymer constituent formed by the drying of the liquid component of said suspension varnish composition, and, embedded in said solid coherent film polymer, solid ultraviolet absorbing polymer particles in the amount of from about two or three percent, by weight, or greater, based on the weight of said solid coherent film polymer, and methods and composition for making the same are disclosed.

2 Claims, No Drawings

ULTRAVIOLET RADIATION PROTECTION FOR MARINE VARNISH

FIELD OF THE INVENTION

This invention relates to varnish, lacquer and paint formulations and, more particularly to marine varnishes and other coatings that, in use, are exposed for extended periods of time to the effects of ultraviolet light.

BACKGROUND OF THE INVENTION

Olefinic polymers such as polyethylene, polypropylene, polyvinyl chloride, polystyrene and polyesters are subject to photo-oxidation when exposed to sunlight over extended periods of time. This photo-oxidation initiates deterioration of the polymer by breaking the polymer chain and by causing formation of carbonyl groups in the molecule. As the oxidation continues, the polyolefin cracks or crazes and loses tensile strength to the point of mechanical failure.

Polyacrylamides, polyamides, polyacrylates and polycarbonates are also affected by ultraviolet radiation exposure such that they tend to discolor and darken; further, certain dyed fibers of these polymers have a tendency to fade under prolonged exposure to daylight. Accordingly, avoidance of these problems by economical incorporation of a suitable stabilizer is highly desirable.

Short wavelengths of ultraviolet radiation are capable of causing photochemical damage to coatings and the surface layers of objects that comprise organic compounds. Exterior surface coatings, such as exterior paints and varnishes, are normally exposed to sun light several hours each day and, therefore, are particularly subject to damage by ultraviolet radiation rays. The shortest wavelength, and most damaging, radiation is in the ultraviolet (UV) range. Wavelengths below 300 nm (nanometers) are the most destructive of the ultraviolet radiation. Most of the ultraviolet rays in this very short wavelength range are absorbed by the atmosphere but sunlight contains ultraviolet radiation in the range of 300 nm to 400 nm is also very destructive of organic materials such as coatings and the surface layer of objects formed of organic compounds. Ultraviolet radiation in the 300 nm to 400 nm range passes through the atmosphere and causes both structural damage and the fading or darkening of colors. Colors often fade and clear coatings and materials tend, generally, to become yellow or darker colored. Even above the ultraviolet range, visible light in the 400 nm to 500 nm wavelength range causes some fading or darkening of colors; however, the very short wavelengths are much more damaging. For example, ultraviolet radiation in the 300 nm wave-length range is approximately 200 times more damaging than visible light in the 500 nm wavelength.

UV absorbers or quenchers are added to most coatings and other organic materials, organic polymers typically, that are expected to be exposed to ultraviolet radiation. The photochemical responses of true absorbers differs from that of true quenchers, but both may be characterized as "absorbers" in the sense used herein, i.e. reaction with ultraviolet radiation to prevent the ultraviolet radiation from reacting with the principle polymer to which the absorber is added. The chemistry of ultraviolet absorbers or quenchers is fairly well known and several classes of ultraviolet absorbing compound are known.

Ultraviolet stabilizers are organic compounds used to protect polymers and coatings from photo degradation induced by sunlight and artificial sources of ultraviolet radiation. They are classified into ultraviolet radiation absorbers or quenchers and ultraviolet radiation-stable anti-oxidants. The former include derivatives of 2-hydroxybenzophenone and 2-hydroxybenzotriazote, and the latter derivatives of hindered amines. Usefulness depends on optical properties, antioxidant effectiveness, long-term stability, solubility in the substrate, volatility, and compatibility with other additives. The following are examples of the numerous ultraviolet absorbers or quenchers known in the art: 1,2-[Bis(3,3,4,5,5-pentamethyl-2oxo-1-piperazinyl)]ethane; 2-(2'-Hydroxy- 3',5'-di-t-butyl)-5-chlorobenzotriazole; 2-(2'-Hydroxy-5-methylphenyl)benzotriazole; 2-(2'Hydroxy-5'-t-octylphenyl)benzotriazole; 2-(3'-t-Butyl-2'-hydroxy-5'-methylphenyl)-5-chlorobenzotriazole; 2-[2'-Hydroxy-3',5'-(di-t-amyl)phenyl]benzotriazole; 2-[2'-Hydroxy-3',5'-(di-t-butyl)phenyl]benzotriazole; 2-[2'Hydroxy-3',5'-di-($\alpha,\alpha$-dimethylbenzyl)phenyl]benzotriazole; 2-Ethyl-2'ethoxy-5'-t-butyloxalanilide; 2-Ethyl-2'-ethoxy-oxalanilide; 2-Ethylhexyl 2-cyano-3,3-diphenylacrylate; 2-Hydroxy-4-dodecyloxybenzophenone; 2-Hydroxy-4-isooctoxybenzophenone; 2-Hydroxy- 4-methoxy-5-sulfobenzophenone, 2Hydroxy-4-methoxybenzophenone; 2-Hydroxy-4-n-octoxybenzophenone, 2,2-Dihydroxy-4,4'-dimethoxybenzophenone; 2,2'-Dihydroxy-4-methoxybenzophenone; 2,2'Thiobis( 4-t-octylphenolato-n-butylamine nickel; 2,2',4,4'-Tetrahydroxybenzophenone; 2,4-Di-t-butylphenyl-3,5-di-t-butyl-4-hydroxybenzoate; 2,4-Dihydroxybenzophenone; and 3,5-Di-t-butyl-4-hydroxybenzoic acid.

Specifications for several classes of ultraviolet radiation absorbers suitable for use in the present invention are available in the literature and may be obtained from manufactures; e.g., SANTASE® (Neville-Synthese Organics, Inc.), CYSORB UV® (American Cyanamid Co.), UVINUL® (BASF Wyandotte Corp.), TINUVIN® (Ciba-Geigy Corp.), SANDUVOR® (Sandoz Color and Chemicals), SALOL® (Dow Chemical Co.) and EASTMAN RMB® (Eastman Chemical Co.).

Dodecyl-hydroxyphenyl benzotriazole isomeric mixtures, preferably the 2-(5'-dodecyl-2'-hydroxyphenyl) benzotriazole isomeric mixtures are known to stabilize polymer systems such as are used in spar varnishes. Such stabilizers may additionally contain antioxidant, for example, a sterically hindered phenol such as 2,6-ditertiarybutyl-4-methylphenol (Ionol); dilaurylthiopropionate; distearylthiodipropionate; etc., or any other useful anti-oxidant. Alternatively, the stabilizer mixture can be incorporated into a final polymeric formulation including the anti-oxidant and other additives. When employed, between about 0. 1 weight percent and about 5 weight percent, more usually 0.25 to 1.5 weight percent, of anti-oxidant based on oxidizable species is suitable. Such stabilizers provide protection from ultraviolet degradation in lacquers, paints and varnishes. Specifically "chalking" of finishes subjected to constant exposure to the elements can be greatly reduced. Such stabilizers can be incorporated in concentrations as high as 10% to 15% (by weight) to provide an exceptionally resistant finish, though it is rare that more than about 5% would be beneficial. Solvents suitable for stabilizers include low and high boiling water immiscible organic solvents and low boiling water soluble organic solvents and dispersants and intermixtures of solvents. Examples of these include lower alcohols of 1 to 4 carbon atoms and containing one or more hydroxy groups, for example, ethanol, methanol, propanol, isopropanol, glycerol, glycol, etc; lacquer vehicles; oils, for example, white petrolatum, paraffin oil, linseed oil, castor oil, oil of lemon, oil of caraway, oil of spearmint, oil of rose, mineral or vegetable oils, such as the polyoxyethylated vegetable oils; olive oil, glycerin, vaseline, cocoa butter, lanolin, light petroleum oils or lubricating oils; tincture of benzoin; aromatic solvents, for example, lower alkyl p-aminobenzoate, benzene, toluene or xylene; higher alcohols; phenol, dimethylphenol, resorcinol; ketones, such as methyl ethyl ketone, ethyl ketone, acetone; alkyl pyrrolidones; cycloaliphatic hydrocarbons, for example, cyclohexane; pyrogallic acid; fatty esters; water based emulsions; alkoxy alkylacetates; ethyl-and butyl-cellusolves; ethylene glycol; terpentine; bisphenols; hydroxy biphenols; triphenyl phosphate and other organic phosphates; sterically hindered phenols, for example, Ionol; phthalates for example, benzylphthalate and dibutylphthalate; ethers, for example Cellosolve, Solox and many others.

For optimum protection, it is desirable to absorb radiation up to 400 nm. An ideal ultraviolet absorber or quencher should absorb the radiation between 290 and 400 nm while transmitting all visible light. Absorption directly above 400 nm causes yellowing of the substrate. No ultraviolet absorber or quencher has this square-wave type of absorption, although substituted 2-(2'-hydroxyphenyl)benzotriazoles approach this ideal most closely. These compounds absorb very strongly throughout most of the ultraviolet region and show a rapid decrease in absorbance approaching 400 nm. Compounds with little or no absorbance beyond 400 nm are preferred for most polymer applications.

Those skilled in the art have always believed that, for optimum screening activity, the absorber or quencher should be molecularly dispersed in the substrate. Incomplete solubility is known, generally, to result in a lower absorbance than the theoretical value calculated from the Beer-Lambert law and that poor solubility also results in exudation of the additive to the polymer surface.

Ultraviolet absorbers or quenchers with extremely low volatility are required for polymers that are extruded at high temperatures. Polycarbonate and poly(ethylene terephthalate) are processed at temperatures of ca 300° C. A considerable amount of the additive is lost when the hot polymers are exposed to the atmosphere unless the additive has a very low vapor pressure. Low volatility is also required for applications such as automotive paints where the stabilizer must suffer only minimal loss during oven drying and outdoor exposure. Volatility can be minimized in a number of ways, such as the introduction of appropriate substituents as in the case of 2-[2'-hydroxy-3',5'-di($\alpha,\alpha$dimethylbenzyl)] phenylbenzotriazole, or chromophores that absorb ultraviolet can be grafted onto the backbones of preformed polymers, built into the polymer chain by condensation, or addition polymerization.

Acrylic polymers are among the most commonly used coating material constituents and are also among the least susceptible to degradation by ultraviolet radiation. Transparent acrylic polymers that are opaque to ultraviolet radiation may be prepared by incorporating ultraviolet absorbers or quenchers in photo-stable acrylics such as polymethylmethacrylate (PMMA). However, the ultraviolet absorber or quencher is lost from the acrylic polymer by evaporation, transfer to other materials where physical contact occurs, such as the use of cleaning cloths, or by being washed out by rain, spray or other contact with liquids. Discoloration, embrittlement, chalking, cracking and loss of mechanical properties result from ultraviolet degradation as the ultraviolet absorber or quencher is removed by evaporation, leaching or partitioning into a liquid phase.

Polyolefins, polystyrenes, polyvinyl chlorides, unsaturated polyesters, polyurethanes, polycarbonates, and polyamides are all subject to discoloration and/or mechanical property degradation by ultraviolet radiation. Acrylics are resistant to ultraviolet degradation but the addition of a ultraviolet absorber increases the long-term weatherability of even acrylics.

Acrylate-, epoxy- and urethane-based varnishes are more resistant to weathering than most coatings, but they degrade over a period of time, sometimes only a few months, and some times a few years, when exposed to the cycling of temperature, moisture and ultraviolet radiation to which exterior surfaces are exposed. Urethane- and epoxy-based varnishes, especially, form sparkling clear, water resistant coatings but are subject to fairly rapid ultraviolet degradation, even though they contain from about 0.1 to 1 percent, by weight, ultraviolet absorber. Some special varnishes are formulated with as high as 3 to 5 weight percent ultraviolet absorber and sold at a premium price. Even with high concentrations of ultraviolet absorber, these varnishes degrade in the presence of ultraviolet radiation over several months.

To the best of the inventor's knowledge, no fully adequate solution to the problem of degradation in marine and other water resistant varnishes has been found. It is to the solution of this problem in particular, and to the improvement of polymer coatings and castings generally, that the present invention is directed.

SUMMARY OF THE INVENTION

The present invention is a polymeric film, coating or layer that has superior long-term ultraviolet resistance comprising a polymer matrix containing very fine particles of solid ultraviolet absorber-containing polymer and a method making the same.

In a specific example, the invention is a marine varnish having suspended therein very fine particles of solid, ultraviolet absorber-containing, polymer, and a coating resulting therefrom.

DESCRIPTION OF THE PREFERRED EMBODIMENTS

The product of this invention is best described by reference to the method of forming the same; accordingly, the best mode of carrying out the invention will be described in method terms.

In general, the method of the invention comprises the steps of a preparing a liquid comprising one or more polymers, copolymers, or polymer blends that, upon drying, cooling or setting, forms a coating, film, layer, sheet or object that is solid and may be rigid or flexible, b mixing particles of a polymer having a maximum diameter of up to about 200 microns that contain ultraviolet absorber into the liquid, the particles as suspended in the liquid until the resulting suspension is used, c thereafter forming the resulting suspension into a desired configuration, which may be a film, coating, sheet or the shape of an object to be manufactured, and then d causing or permitting the suspension to dry, cool or set to form a solid object, such as a solid film, coating, sheet or object.

There is, theoretically, no minimum diameter for the ultraviolet absorber-containing polymer, the lower limit simply being the smallest size that is practically and economically attainable. Nor is the upper limit of 200 microns a hard and fast number, but particles of 200 microns diameter and larger tend to adversely effect the appearance and/or physical properties of the film, coating or sheet. It is, usually, not feasible and economical to comminute solid blocks or plates of polymer into particles below about 15 microns diameter, but finer particles can be obtained by special techniques. For example, finer particles would be expected to result from ball-milling or grinding the solid ultraviolet absorber-containing polymer at liquid nitrogen temperatures. Very fine particles of solid ultraviolet absorber-containing polymer can be specially prepared by conventional emulsion polymerization followed by spray drying the resulting emulsion.

Maintaining the particles in suspension is simply achieved using any of the well-known paint formulation techniques. Even though the particles normally have a higher density than the liquid phase, the addition of the particles tends to cause the liquid to thicken and, ultimately, to gel; consequently, the system tends to be self-stabilizing. The degree of gelling can be controlled and limited by controlling the nature and size of the particles. Very small spherical particles, such as result from emulsion polymerization, have only slight tendency to cause gelling. Larger, crushed particles have an increased tendency to gel the system. Mixtures of particle sizes and shapes can be used to establish the desired thickening of the liquid and, if larger particles are desire, the large particles can be smoothed by tumbling and/or by solvent vapor treatment while the particles are air-suspended.

The liquid may be a solution or emulsion that comprises a polymer system that forms a coherent film, sheet or object when it is allowed to set, cool or dry, according to the particular polymer system. For example, a varnish generally comprises a solution of a polymer system, e.g. polyurethane, polyacrylate, polyamide, or a blend of polymers or copolymers, in a solvent. When the varnish is applied and allowed to dry, i.e. the solvent is allowed to evaporate, the varnish forms a coherent film or coating that, typically, is adherent to the surface to which it is applied, but may also be applied to a release coating to form a free-standing film. Comparable films may be formed from such polymer systems that are in emulsion form in water. In most instances, the polymer system-containing liquid will include one or more flatting agents, co-solvents, stabilizers, wetting agents, etc., as are well-known in the paint and varnish art and which are not, per se, part of this invention. The polymer system may comprise a single polymer or copolymer or a blend of polymers and/or copolymers.

The liquid may be a molten polymer into which the particles of a polymer of under 1 micron to about 200 microns maximum diameter that contain ultraviolet absorber are mixed to form the suspension. In this example, the polymer system and particles must be selected such that the particles do not melt into the liquid. The particles may, in every instance, soften and even deform, but they must remain particulate. An example of the use of a molten liquid-particle suspension is a molten low molecular weight polyolefin, e.g. polyethylene or polypropylene, into which particles of ultraviolet absorber-containing polymethylmethacrylate, polyamide, polystyrene, etc., are mixed. The suspension may, if necessary, be used relatively soon after the mixing to prevent melting of the particles if the particles melt within a few degrees of the melting point of the molten polymer. In this example, the suspension is formed into the desired configuration, e.g. a film or an object of a desired configuration, and the entire suspension is cooled or allowed to cool to form the final article in which the invention is embodied.

The liquid may be a solution or emulsion that comprises a polymer system that sets by cross-linking, i.e. a thermosetting polymer system, to the final configuration. For example, epoxies and some polyesters are liquids or may be carried in a solvent to form a liquid, and remain a liquid until a catalyst or initiator is added at which time the liquid begins to set, either by cross-linking or by a combination of evaporation of solvent and cross-linking, to a solid state. The setting time can be controlled so that there is ample time for forming the desired configuration, e.g., painting a surface, casting an object, etc. Comparable films and articles may be formed from such polymer systems that are in emulsion form and set by reaction with or absorption of the water. In most instances, the polymer system-containing liquid will include one or more flatting agents, co-solvents, stabilizers, wetting agents, etc., as are well-known in the paint and varnish art and which are not, per se, part of this invention. The polymer system may comprise a single polymer or copolymer or a blend of polymers and/or copolymers.

In view of the long-felt need for long-term ultraviolet resistant varnishes, water-resistant or marine varnishes in particular, the best mode for carrying out the invention has been developed in the form of a marine varnish composition and the resulting ultraviolet resistant coating. Accordingly, the following examples are provided to illustrate the invention generally and specifically with respect to the best mode presently contemplated.

Oleoresinous binders are prepared by reacting drying oils with natural or synthetic resins. The resins used include coumarone, indene and kauri resins. These binders are used to produce varnishs that dry to brittle or flexible films depending on the ratio of oil to resin, and virtually any degree of flexibility can be obtained by varying the oil to resin ratio.

Epoxy resins result from the reaction of an epoxide or oxirane compound with, typically, bisphenol or phenolic resins. These resins cross-link relatively slowly but the rate of cross-linking can be controlled by the addition of various curing agents. Such resins yield a cross-linked polymer that exhibits excellent color and chemical resistance but are subject to ultraviolet degradation. Esterification of epoxides with fatty acids yield epoxy esters having superior chemical resistance, great strength and flexibility and having good adhesion, and, consequently, can be used to produce strong, adherent varnishes.

Polyurethane resins formed by the reaction of isocyanates and hydroxyl compounds are among the most important varnish polymer systems used in industry and in marine applications. Polyurethanes used in varnish manufacture are prepared from di-isocyanates which form linear polymers upon reaction with diols and cross-linked polymers when reacted with polyols, such as polyesters, polyethers or some vegetable oils and water. These polymer systems form the basis of varnishs that are water and chemical resistant, strong, flexible and adherent, but are subject to ultraviolet degradation. Polyurethane polymer systems may be formulated into crystal clear varnishes that may be used in the clear form, dyed or pigmented. Polyurethane polymer systems may be "single pack" systems, i.e., are formed by air curing (oxidative polymerization), moisture curing or heat curing. Uralkyds, urethane-alkyd, polymer systems are used to manufacture very useful and popular air drying varnishes that form films having good abrasion resistance, water resistance and adhesion. They are, however, subject to ultraviolet degradation. "Two pack" polyurethane resin based systems result from the mixing of a cold-curing isocyanate-polyol system with a catalyst curing isocyanate adduct-polyol system that polymerize in situ within a short period of time following mixing.

Varnishes may contain a variety of additives to yield particular characteristics in the varnish before application or in the film resulting from the application, or both. Plasticizers, for example, are added to increase the flexibility of the film or coating. The effect of plasticizers has been extensively studied and those skilled in the art fine it easy to select appropriate plasticizers, depending on the polymer system and the desired result. Diethyl phthalate is a very commonly used plasticizer. Other widely used plasticizers include dioctyl phthalate, triphenyl phosphate and tricresyl phosphate, and butyl stereate.

Most varnishes, except those that form films by in situ polymerization, are based on a liquid that is a solution of polymer system in a solvent system. The polymer system may comprise a combination of polymers or copolymers. Likewise, the solvent system may comprise a combination of solvents. Typically, two or more solvents are used in the solvent system to achieve a desired drying rate. It is important that the solvent system maintain the applied layer of varnish in a liquid or gel state that is permeable to the solvents to permit evaporation of the solvents from throughout the layer of varnish. If a skin forms to quickly, the varnish will blister as the remaining solvent evaporates. Solvents are also used as simple diluents to permit a convenient thickness of varnish to be easily applied and to control viscosity. Typical solvents include aliphatic hydrocarbons (white spirits), aromatic hydrocarbons, esters, ketones, glycol ethers and alcohols.

Drying accelerators are used in oxidation curing varnishes to increase the drying or curing rate of the varnish when it has been applied. Drying accelators accelerate the oxidation rate of the unsaturated oil component of the polymer system. Drying accelerators are generally oil soluble organic acid salts of various metals, most of them being naphthnates of lead, cobalt and manganese.

The formulation of typical air drying gloss varnish suitable for marine use, on exterior wood for example, that may be applied by brushing is given in Table I, which follows:

TABLE I

| Air Drying Varnish | |
|---|---|
| Long oil length drying oil-modified alkyd resin in white spirit solvent, 70% by weight polymer system, 30% by weight solvent: | 85 parts* |
| Benzotriazole | 2 parts |
| White spirit | 11 parts |
| Cobalt napthenate, 6% metal content | .5 part |
| Lead napthenate, 24% metal content | 1.2 part |
| Methyl ethyl ketoxime anti-skinning solvent | .1 part |

*All parts by weight.

There are also standard formulations in the industry that vary only insignificantly from manufacturer to manufacturer; for example, two classes of marine varnish are identified as "Spar-A" and "Spar-B" varnishes.

The best mode for carrying out the invention may begin with an oil-alkyd resin based polymer system such as described in Table I, with Spar-A, Spar-B or any other liquid marine varnish. This is the liquid component of the varnish of this invention.

Polymethylmethacrylate (PMMA) that contains one or more ultraviolet absorbers, such as those described above, is prepared in the form of fine particles having a major dimension of from about 1 micron or less to about 200 microns, preferably under about 45 microns for smooth surfaces. The term "major dimension" as used here means the length of a non-spherical particle or the diameter of a spherical particle. Such particles may be formed by crushing or grinding ultraviolet absorber-containing PMMA or the ultraviolet absorber-containing PMMA may be formed as particles. PMMA can be comminuted to form particles in the desired size range using conventional crushing and grinding equipment, but better results are achieved if the comminution is carried out at low temperatures, below 0° C., at which the PMMA is quite brittle. PMMA may also be prepared specifically for use in the invention. The following are non-limiting examples of the preparation of PMMA microspheres for use as the particulate constituent of the varnish of the present invention.

EXAMPLE 1

The following reagents were introduced into a reactor vessel in the order described below:

| | |
|---|---|
| Distilled, deionized water | 450 cc |
| Methyl methacrylate (MMA) | 200 cc |
| Magnesium carbonate (~6 wt. percent) | 11.2 gms |
| Benzoyl peroxide (~0.6 wt. percent) | 1.2 gms |
| Tinuvin P ultraviolet absorber (~5 wt. percent)* | 9.5 gms |

*Tinuvin (® Ciba-Geigy Corp.) is a 2-(2'-hydroxyphenyl)-benzotriazole. This compound and other ultraviolet absorbers are listed and described in HANDBOOK OF COATINGS ADDITIVES, Leonard J. Colbo, Ed.

The reaction vessel was purged with nitrogen and kept under a nitrogen blanket, the water was added and heated to 90° C. and the magnesium carbonate was added with agitation. The MMA was heated to 90° C. and the benzoyl peroxide and then the ultraviolet absorber were added with constant stirring to the MMA, and the stirring continued until all of the ultraviolet absorber was dissolved, at which time the MMA solution was held at 90° C. for 10 minutes. The MMA solution was slowly added to the agitated water in the reaction vessel until all of the MMA solution was added to the reaction vessel. The reaction vessel contents were heated for one hour at 90° C. and then heated to 100° C. Exotherm was not achieved.

EXAMPLE 2

Example 2 is identical to Example 1, except 1, rather than 5, weight percent ultraviolet absorber was added.

Microspheres resulting from these runs were used in the preparation of varnish as described. For smooth surfaces, the microspheres should have a maximum diameter of about 45 micron major dimension and preferably nearer 25 microns. For deck surfaces, however, where anti-skid properties are desirable, particles in the range about 125±75 microns are preferred. The molecular weight of the PMMA was estimated at about 60,000.

A PMMA particle containing varnish was prepared by mixing one part by weight of PMMA microspheres as described above into two parts by weight of a commercial varnish, (BENCHMARK™—Major Paint Co., 29 volume percent polyurethane, 19 volume percent alkyd, balance solvent and minor additives) sold by STANDARD BRANDS™ to form a uniform suspension. Two identical acrylic plates (acrylic window and picture panes) were coated, one with the varnish alone and one with the suspension varnish of this invention. Each plate had 2.2 grams of liquid resin and one plate also had 0.9 gram of 3.7 wt. percent ultraviolet absorber-containing PMMA microsphere particles. A blank plate, the plate coated with only liquid varnish component and the plate coated with the particle suspension varnish of this invention were tested using a microwatt meter to determine if the particles effectively increased the ultraviolet absorption of the varnish film. The particle-containing varnish film of this invention absorbed 34 units of ultraviolet radiation (34 ultraviolet units) whereas the film of varnish formed from the liquid alone absorbed only 12 ultraviolet units. The 0.9 grams of microspheres containing 3.7 wt. percent of ultraviolet absorber was shown to be very effective, absorbing 22 $\mu Wcm^2$ (microwatts per square centimeter)×100 ultraviolet radiation.

Particles of ultraviolet absorber-containing solid polymers of various types, of which PMMA is but the preferred example, may be used. As an example, polycarbonate particles can be prepared as follows. A mixture of 1.5 grams stabilizer, such as 2-(5'-dodecyl-2'-hydroxyphenyl) benzotriazole, and 60 grams of Lexan® polycarbonate powder (the thermoplastic, carbonate-linked polymer of bisphenol and phosgene) is added to a Brabender® mixer preheated to 300° C. After a mixing time of 5 minutes, the mixture is dismantled and the molten polycarbonate mixture removed, cut into small pieces while hot and then allowed to cool to room temperature. A 10 mm sheet of the polycarbonate, containing 2.5% of the stabilizer, prepared by applying 5,000 pounds pressure to 3. 5 grams of the milled mixture in a Carver press, using a 10 mm stencil at 500° C. for 5 minutes A uniform sheet of the stabilized polymer thus obtained is chilled to liquid nitrogen temperature and comminuted by hand or by a ball mill or other comminuting device to form particles of the desired size, under about 200 microns, as measured at the maximum diameter, i.e. the major dimension. The particles are screened to separate oversize and, if desired, undersize particles, though under size particles are not normally a detriment. These particles can be used as described above.

The mode of reaction to ultraviolet radiation in varnishes of the type described is not fully understood yet. It is certainly safe to conclude, however, that initially, at least, the ultraviolet absorber in the particles is largely responsible for protecting the varnish. It is known that the ultraviolet absorber will partition, over a period of time, into the varnish polymer system (the portion of the varnish film formed from the liquid polymer constituent of the varnish suspension), thus providing a continuing, time-release of ultraviolet absorber into the polymer system, especially if the polymer of which the particles are formed is relatively low (<100, 000) molecular weight. If the particle polymer has a very high molecular weight, lesser amounts of the ultraviolet absorber will dissolve out of the particles and into the varnish polymer system. If the particle polymer has a very high molecular weight, a comparatively high level of ultraviolet radiation absorber will exude into the varnish film if the level of ultraviolet absorber is high, e.g. about ten percent or more of the solid particles. This phenomenon makes it possible to provide a varnish that has very unique ultraviolet resistance and a variety of physical characteristics, as exemplified by the following example formulations.

EXAMPLE 3

A deck varnish with very high ultraviolet resistance and anti-skid characteristics may be prepared by mixing:

A: One part (by weight) of PMMA microspheres having a molecular weight of under 100,000 and a particle size of less than 45 microns containing 3 percent (by weight) of a ultraviolet absorber, such as, for example, one or more of the following:

1,2-[Bis(3,3,4,5,5-pentamethyl-2-oxo-1-piperazinyl)]ethane; 2-(2'-Hydroxy- 3',5'-di-t-butyl)-5-chlorobenzotriazole; 2-(2'-Hydroxy-5-methylphenyl)benzotriazole; 2-(2'-Hydroxy-5'-t-octylphenyl)benzotriazole; 2-(3'-t-Butyl-2'-hydroxy-5'-methylphenyl)-5-chlorobenzotriazole; 2-[2'-Hydroxy-3',5'-(di-t-amyl)phenyl]benzotriazole: 2-[2'-Hydroxy-3',5'-(di-t-butyl)phenyl]benzotriazole; 2[2'-Hydroxy-3',5'-di-($\alpha$, $\alpha$-dimethylbenzyl)phenyl]benzotriazole; 2-Ethyl- 2'-ethoxy-5'-t-butyloxalanilide; 2-Ethyl-2'-ethoxyoxalanilide: 2-Ethylhexyl 2-cyano-3,3-diphenylacrylate; 2-Hydroxy-4-dodecyloxybenzophenone; 2-Hydroxy-4-isooctoxybenzophenone: 2-Hydroxy- 4methoxy-5-sulfobenzophenone, 2-Hydroxy-4-methoxybenzophenone; 2-Hydroxy-4-n-octoxybenzophenone, 2,2-Dihydroxy- 4,4'-dimethoxybenzophenone; 2,2'-Dihydroxy-4-methoxybenzophenone; 2,2'Thiobis(4-t-octylphenolato-n-butylamine nickel; 2,2',4, 4'Tetrahydroxybenzophenone; 2,4-Di-t-butylphenyl-3,5-di-t-butyl-4-hydroxybenzoate; 2,4-Dihydroxybenzophenone; and 3,5-Di-t-butyl-4hydroxybenzoic acid;

B. One part (by weight) polycarbonate particles having a particle size of greater than 100 microns containing 3 percent (by weight) of a ultraviolet absorber such as, for example, one or more of the following: 1,2-[Bis(3.3,4,5,5-pentamethyl-2-oxo-1-piperazinyl)]ethane; 2-(2'-Hydroxy-3',5'-di-t-butyl)-5-chlorobenzotriazole; 2-( 2'-Hydroxy-5methylphenyl) benzotriazole; 2-(2'-Hydroxy-5'-t-octylphenyl)benzotriazole; 2-(3'-t-Butyl-2'-hydroxy-5'-methylphenyl)-5-chlorobenzotriazole; 2-[2'-Hydroxy-3',5'-(di-t-amyl)phenyl]benzotriazole; 2-[2'-Hydroxy-3',5'-(di-t-butyl)phenyl]benzotriazole; 2[2'-Hydroxy-3', 5'-di-($\alpha$,$\alpha$-dimethylbenzyl)phenyl]benzotriazole; 2-Ethyl- 2'-ethoxy-5'-t-butyloxalanilide; 2-Ethyl-2'-ethoxyoxalanilide; 2-Ethylhexyl 2-cyano-3,3-diphenylacrylate; 2-Hydroxy-4-dodecyloxybenzophenone; 2-Hydroxy-4-isooctoxybenzophenone; 2-Hydroxy- 4methoxy-5-sulfobenzophenone, 2-Hydroxy-4-methoxybenzophenone; 2-Hydroxy-4-n-octoxybenzophenone, 2,2-Dihydroxy- 4,4'dimethoxybenzophenone; 2,2'Dihydroxy4methoxybenzophenone; 2,2Thiobis(4-t-octylphenolato-n-butylamine nickel; 2,2',4, 4'-Tetrahydroybenzophenone; 2,4-Di-t-butylphenyl-3,5-di-t-butyl- 4-hydroxybenzoate; 2,4-Dihydroxybenzophenone; and 3,5-Di-t-butyl-4hydroxybenzoic acid;; and C. Three parts (by weight) of liquid polyurethane varnish wherein the polyurethane polymer system is air curing polyurethane formed by the reaction of isocyanates and hydroxyl compounds and solvents and optionally containing plasticizer(s), flow control agents, flatting agents, dye, pigment, etc.

The only practical limit on the ratio of particles to liquid varnish is that the resulting mixture be capable of being cast, brushed, sprayed or otherwise applied as may be preferred by the user. Generally, however, a ratio of greater than one part particles to one part liquid (by weight) is very difficult to handle and is probably not suitable for spraying. The formulation thus consists essentially of a liquid polymer system component and particles of ultraviolet absorber-containing polymer particles suspended in the liquid component. Any number or type of additives are permitted so long as the basic character of the composition, namely that when spread on a surface and permitted to dry, it forms a coherent coating on such surface, the coating comprising a solid polymer constituent formed by the drying of the liquid component in which is embedded the solid ultraviolet absorbing polymer particles.

The same basic formulation can be made with only the larger polycarbonate particles, thereby foregoing some of the ultraviolet absorbency, or with only the PMMA particles to form a smooth, glossy layer of varnish having good ultraviolet absorbency.

EXAMPLE 4

A suspension of liquid polyurethane as described above may be formed with a mixture of high molecular weight (>200,000) PMMA particles containing 1 to 5, or higher, weight percent ultraviolet absorber and low molecular weight (<100,000) PMMA particles containing 1 to 5, or higher, weight percent ultraviolet absorber. Shorter term, but still much extended, ultraviolet protection is provided by the low molecular weight particles and very, very long term ultraviolet protection is provided by the ultraviolet absorber in the high molecular weight particles.

The ratio of particles to liquid in the suspension can be varied greatly, but, generally, the end film or coating resulting from the spreading and drying of the suspension should comprise at least approximately two to three percent, by weight, of the end product. Solid pigments, fillers and the like, and soluble coloring agents may be added without departing from the invention. Typically a colored solid pigment-containing composition would be called a paint, rather than a varnish; however, the same technology is involved generally and for present purposes such compositions are merely pigmented varnishes.

It will be apparent from the foregoing examples and description that a large variety of varnishes, paints and other coatings, films and objects can be easily made using the concept of this invention.

Industrial Application

This invention is useful in the paint and varnish industry, in the marine industry, in the painting profession, and in industries that manufacture or produce items that are exposed to the sun or other ultraviolet sources in use.

What is claimed is:

1. A liquid varnish for forming a substantially clear film consisting essentially of a clear varnish forming liquid polymer system and suspended therein particles of non-cross-linked clear polymer particles having an average diameter of less than 200 microns that contain dissolved ultraviolet absorber.

2. A solid, coherent substantially transparent film of dried varnish formed from varnish composition that comprises a clear liquid component and a component comprising solid non-cross-linked polymer particles, the film of dried varnish consisting essentially of a substantially transparent solid coherent film polymer formed by the drying of said liquid component of said varnish composition, and, embedded in said solid coherent film polymer, clear solid ultraviolet absorbing non-cross-linked polymer particles having dissolved in said particles an ultraviolet absorber compound, said particles having an average diameter of less than 200 microns.

* * * * *